United States Patent [19]
Brown

[11] Patent Number: 5,529,245
[45] Date of Patent: Jun. 25, 1996

[54] LOW COST DISPENSER FOR MULTI-COMPONENT FOAMS

[75] Inventor: Daniel P. Brown, Palos Park, Ill.

[73] Assignee: Insta-Foam Products, Joliet, Ill.

[21] Appl. No.: 264,640

[22] Filed: Jun. 23, 1994

[51] Int. Cl.$^6$ ........................ B05B 7/04
[52] U.S. Cl. .................. 239/390; 239/400; 239/415; 239/416.1; 239/428; 239/432; 239/487; 239/528; 222/145.7
[58] Field of Search .................... 239/390, 391, 239/400, 414, 415, 416.1, 417.5, 428, 432, 487, 528, 300; 222/145, 137

[56] References Cited

U.S. PATENT DOCUMENTS

| | | |
|---|---|---|
| 1,262,351 | 4/1918 | Jones et al. . |
| 1,436,145 | 11/1922 | Birkenmaier ............................ 239/528 |
| 2,335,116 | 11/1943 | Hansen . |
| 2,513,081 | 6/1950 | Clark et al. . |
| 2,991,015 | 7/1961 | Standlick . |
| 3,132,808 | 5/1968 | Ott .......................................... 239/415 |
| 3,157,361 | 11/1964 | Heard . |
| 3,199,790 | 8/1965 | Giesemann . |
| 3,330,484 | 7/1967 | Johnson et al. ......................... 239/428 |
| 3,399,837 | 9/1968 | Frick ....................................... 239/415 |
| 3,623,669 | 11/1971 | Woods . |
| 4,093,188 | 6/1978 | Horner . |
| 4,169,545 | 10/1979 | Decker . |
| 4,213,936 | 7/1980 | Lodrick ................................... 239/428 |
| 4,262,847 | 4/1981 | Stitzer et al. . |
| 4,263,166 | 4/1981 | Adams .................................... 239/414 |
| 4,676,437 | 6/1987 | Brown .................................... 239/414 |
| 4,759,502 | 7/1988 | Pomponi, Jr. et al. ................. 239/415 |
| 4,760,956 | 8/1988 | Mansfield . |
| 4,840,493 | 6/1989 | Horner . |
| 4,850,705 | 7/1989 | Horner . |
| 4,909,420 | 3/1990 | Reyner . |
| 4,925,107 | 5/1990 | Brown .................................... 239/414 |
| 5,012,975 | 5/1991 | Korsmeyer . |
| 5,129,581 | 7/1992 | Brown et al. ........................... 239/414 |
| 5,219,097 | 5/1993 | Huber et al. . |
| 5,388,768 | 2/1995 | Moses ..................................... 239/428 |

Primary Examiner—Karen B. Merritt
Attorney, Agent, or Firm—Lockwood Alex FitzGibbon & Cummings

[57] ABSTRACT

A mixing and dispensing gun with a valve body containing a pair of liquid inlets, a pair of separate liquid outlets, a gas outlet and a removable mixing and dispensing nozzle. The nozzle contains the ingredients while they are being mixed and a gas outlet is positioned within the nozzle so as to propel the mixed ingredients to the application area. The nozzles and gun body include cooperating inlet and outlet ports such as nipples and recesses to permit alignment and sealing when the nozzle is positioned for use. The gas valve is arranged so that it may be operated simultaneously or in sequence with the liquid valves.

13 Claims, 3 Drawing Sheets

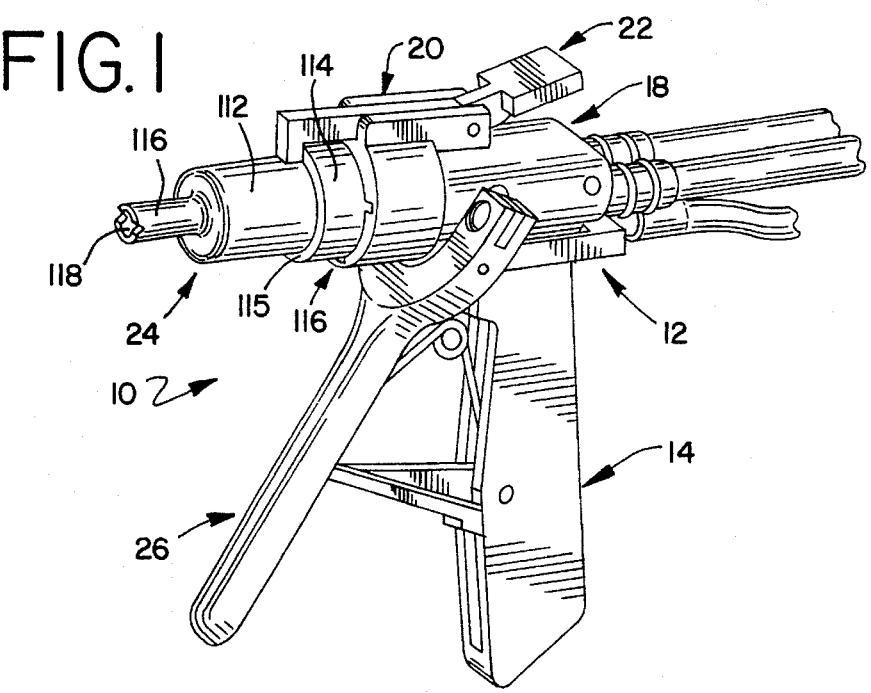
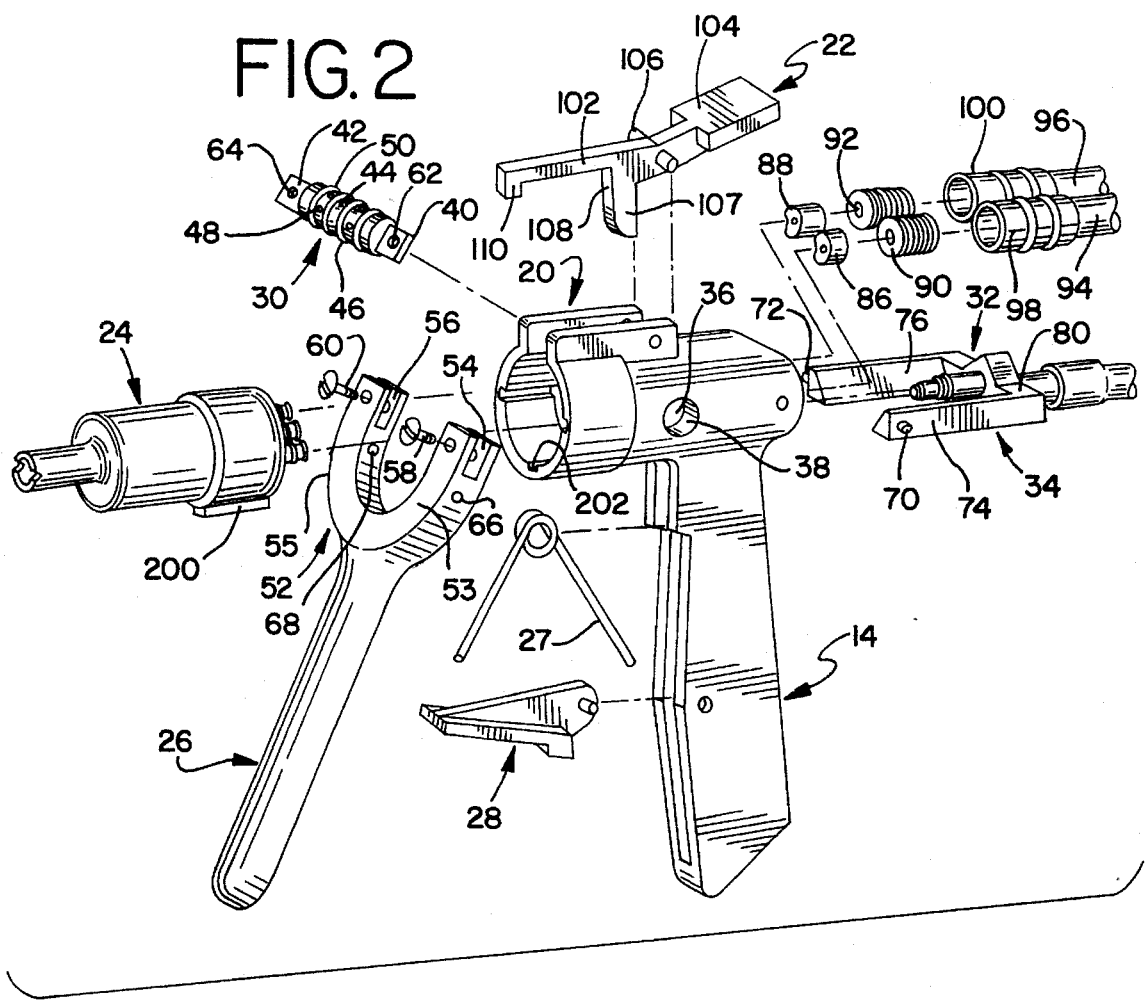

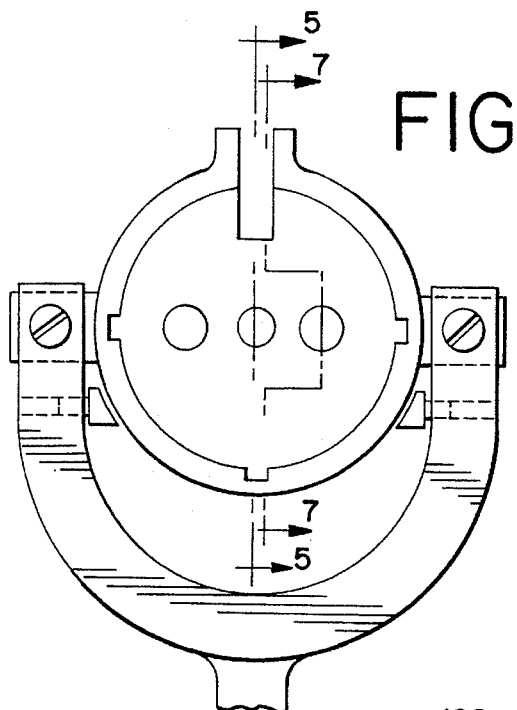
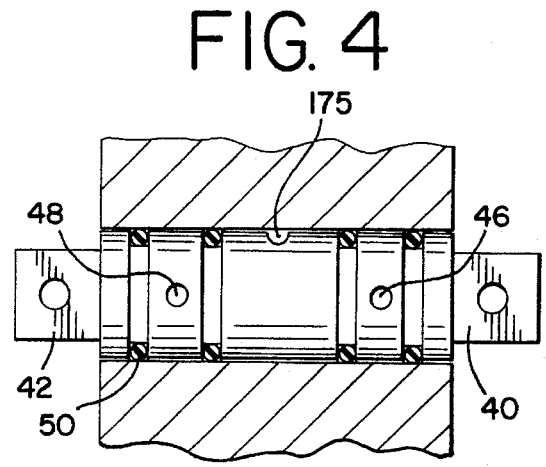
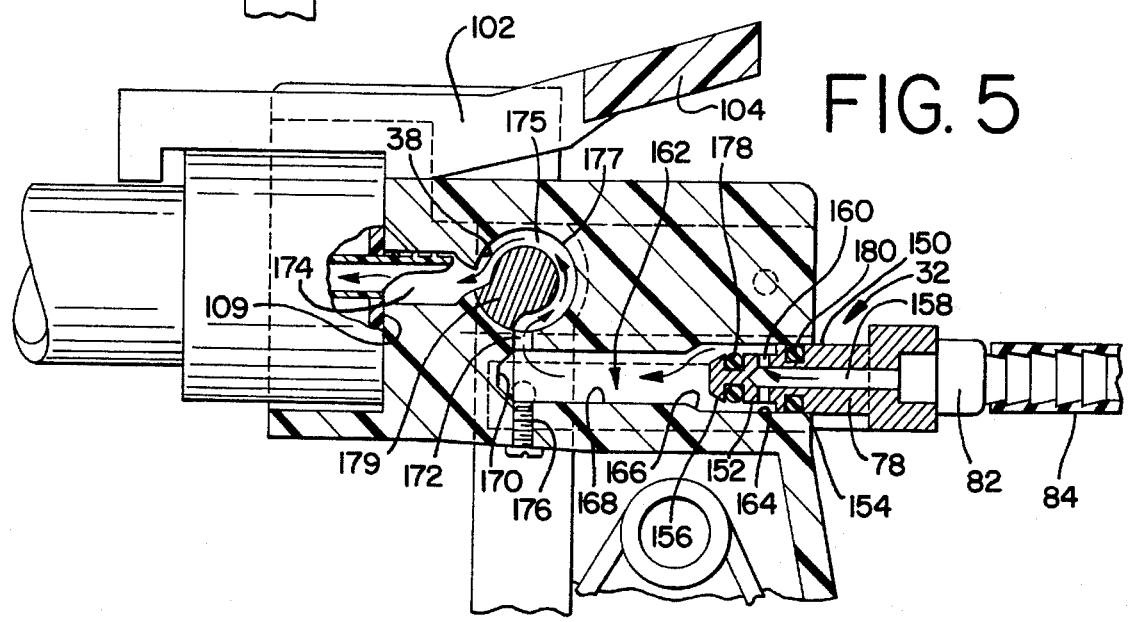
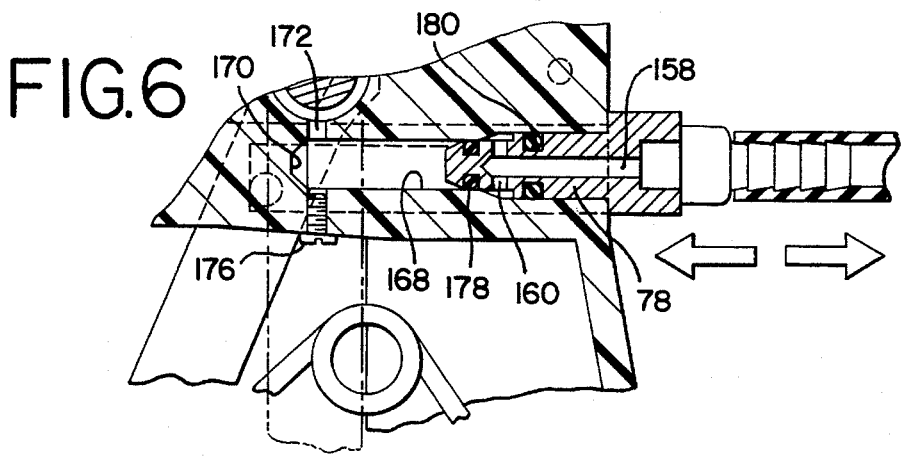

LOW COST DISPENSER FOR MULTI-COMPONENT FOAMS

BACKGROUND OF THE INVENTION

The present invention relates generally to apparatus for mixing and dispensing multi-component materials, and in particular, to a gun for dispensing a two-component plastic foam wherein spraying and/or mixing are carried out or assisted by pressure from a confined gas. The pressurized gas may be carbon dioxide, or other gas. In the preferred form, the gun is constructed and arranged so as to be suitable for throw-away use, i.e., to form a part of a kit that is able to be discarded when the contents forming a part of the kit are depleted.

In recent years, improvements have been made in dispensing multi-component plastic materials, primarily foams, many of which are urethane foams or those involving similar chemistry. In such foams, an "A" or isocyanate component and a "B" or resin component are mixed adjacent the point of dispensing and the thus-formed mixture reacts in or near the dispensing nozzle or like part of the apparatus. In the past, the combination of the heat from the reaction between the resin and the isocyanate, and the reduced pressure resulting from passage outside a pressurized container would cause a dissolved liquid propellant, such as a halocarbon of low boiling point, to expand and create a froth. Such expansion can also be used to create a propulsive force.

Systems of this sort have been placed in widespread use and have made it possible for a wide variety of users to derive the benefits of on-site generation and dispensing of urethane foam for purposes of insulation, flotation, void fill and the like. Prior to the development of urethane foam systems such as those described in U.S. Pat. Nos. 3,784,110 and 4,676,437, for example, urethane foams were made in factories by non-portable equipment. In some cases, very small, aerosol-can sized quantities were available, but these were too small and expensive for use in commercial construction or industrial applications. The development of the patented systems referred to above enabled urethane foam to be mixed on-site and dispensed from kits that were light enough to be portable by users, and yet large enough to dispense significant quantities of foam. Typically, the kits that are readily portable are capable of mixing and dispensing 100–600 board feet of uniformly high quality urethane foam. Such foam usually has a finished density of 1.5 to 4.5 pounds per cubic foot ("pcf") and provides buoyancy, adhesion structural rigidity and outstanding heat insulation.

However, in the last several years, there has been significant concern with the relatively recently developed belief that the propellants for such dispensing systems are harmful to the environment. It is now widely accepted that many kinds of propellants previously used in urethane foam systems, namely, fluorocarbon propellants, including so-called CFC's, HFC's, HCFC's and other volatile organic compounds ("VOC's") are harmful to the earth's ecology. In one particular, for example, it is believed that fluorocarbons deplete ozone from the upper atmosphere.

Consequently, for reasons of regulatory compliance and environmental concerns generally, alternative propellants have been sought for use with foam systems. While alternate propellant systems are known, including the use of perhaps other halocarbons and carbon dioxide, most or all of these other propellants have suffered from disadvantages and drawbacks of various kinds. In one case, alternate fluorine-containing propellants have been expensive and difficult to obtain in a desirable range of boiling points. Some low molecular weight hydrocarbons are available, but VOC and flammability considerations are a problem.

Some carbon dioxide ($CO_2$) systems have involved use of the isocyanate in the "A" component to create carbon dioxide, usually by reacting it with water, to create $CO_2$. This has some advantages if used for foam blowing only, but is relatively wasteful if the expensive isocynate is sought to be used as a propellant. This was one historic reason for developing "Freon" (fluorocarbon) propellants in the first place. Consequently, while the use of $CO_2$ as a blowing agent and as a propellant is known, making propellant from isocyanate is undesirable.

As a consequence of the foregoing, there has been a need for a dispensing system wherein it would be practical for a suitable gas to be used as a propellant, either wholly or in part, and wherein the contents of two containers of the foam-forming or other compounds could be reliably mixed and dispensed at low cost. There has also been a need for a dispensing gun having an improved valving system, preferably a system wherein the flow of both liquid and gas or vapor phase constituents could be controlled in a desirable way. Such a gun could be used in plants or in portable throwaway applications. There has also been a need for a dispensing gun system wherein it is possible to provide sufficient propellant to insure dispensing of two mixed components of a urethane or like foam through a range of dispensing rates.

There has also been a need for a dispensing spray gun which could be used with inexpensive, throw-away nozzles that would provide a static mixing function for the liquids, and a function for the gas or vapor used to apply the products.

Inasmuch as there is no highly satisfactory disposable multi-component foam dispensing gun and nozzle system able to dispense mixable urethane foam or like ingredients and propel them to the installation site either using economically generated $CO_2$ as part or all of the propellant, or using another gas source, it is an object of the present invention to provide an improved dispensing system for such foams.

Another object of the present invention is to provide a foam dispensing gun which includes an improved, separable, low-cost, throw-away nozzle for use with such an improved dispensing system.

Another object of the present invention is to provide a spray nozzle that develops a desirable spray pattern using $CO_2$ or other suitable gas as a propellant.

Yet another object of the invention is to provide a dispensing gun that includes a pair of liquid inlet ports registered through a valve system with a pair of liquid outlet ports, and which further includes gas inlet and outlet ports, with flow of liquid and gas respectively through the ports being controlled by different but commonly operated valving systems.

A further object of the invention is to provide an improved dispensing gun using a single trigger that actuates two kinds of valves, one suitable for liquid metering and the other for metering a gas, a liquid, or other propellant.

A still further object of the invention is to provide a mixing and dispensing system which includes a low-cost dispensing gun and a throw-away nozzle, with the nozzle including a pair of liquid inlet ports, a gas propellant inlet port, a static mixer for the liquids and a discharge area at which the propellant gas impinges upon the liquids being mixed and expanding and serves to propel them from the nozzle inlet.

Another object of the present invention is to provide a nozzle that will use a minimal amount of gas to achieve high liquid shear for mixing and propulsion.

Yet another object of the invention is to provide a mixing and dispensing gun which utilizes a triggering system capable of simultaneously or sequentially operating a propellant valve and a pair of liquid discharge valves.

A further object of the invention is to provide a low cost dispensing system utilizing a dispensing gun having a gas valve arrangement whereby sufficient propellant to expel being-formed foam from a mixing and dispensing nozzle can be provided at various liquid flow rates and wherein the gas flow rate is not directly proportional to the flow of liquid into the mixing nozzle.

A still further object of the invention is to provide a mixing and dispensing system which includes a mixing gun having three inlets and three outlets, and which is adapted for use with a nozzle that confines the being-mixed chemicals to its interior and which also provides an annular liquid discharge and propellant impingement area within the product outlet nozzle.

Another object of the invention is to provide a dispensing gun which includes pairs of inlet and outlet passages for liquid components and a spool valve having passages movable into and out of full and partial registry with such ports to control liquid flow, and which also includes a gas flow valve, with both the spool valve and the gas valve being actuable by a single trigger.

Yet another object of the invention is to provide a gas dispensing system which includes a gas valve having a passage of major and minor diameters, a valve core with counterpart major and minor diameters, and an interior passage arrangement whereby axial movement of the stem permits gas flow through the minor diameter passage and into the mixing and discharge nozzle.

It is still another object of the present invention is to provide a dispensing gun for foam products wherein the gas valve stem is carried by a yoke secured to one portion of a trigger which also actuates the liquid flow valves.

A still further object of the invention is to provide an arrangement of valves and a trigger including a spool valve having ears on both ends actuable by a bifurcated trigger and further including a gas valve having a reciprocable core with stepped diameters, with the core being carried by a yoke mechanism that is also connected to the trigger.

Another object of the invention is to provide a gun wherein the valve core or stem for the air passage includes a hose connection secured to the valve core and arranged such that the hose and valve core move together and whereby the only primary gas seal is between registered parts of the valve passage and the valve core.

Yet another object of the invention is to provide a number of the foregoing features in a combination which further includes a latching and ejector mechanism for a replaceable nozzle and which includes other desirable elements including a reliable trigger spring return and trigger safety assembly.

Still another object of the invention is to provide a combination of two types of valves for liquid and gas, respectively, each operating on a different principle, but being actuated by a single trigger.

A further object of the invention is to provide a gun wherein the valves open at different times but are operable by a single trigger.

The foregoing and other objects and advantages of the invention are achieved in practice by providing a dispensing gun that includes a handle, an assembly for receiving a removable together with a trigger unit that actuates liquid and gas valves, respectively including a spool valve and a reciprocable valve core, with all valves being positioned within passages for receiving liquid or gas constituents and each communicating with an inlet on the nozzle. The invention also achieves these and other of its objects by providing such a gun made from low cost, but reliable materials.

The manner in which the foregoing and other objects and advantages are achieved in practice will become more clearly apparent when reference is made to the following detailed description of the preferred embodiment of the invention set forth by way of example and shown in the accompanying drawings, wherein like reference numbers indicate corresponding parts throughout.

BRIEF DESCRIPTION OF THE DRAWINGS

FIG. 1 is a perspective view of the improved mixing and dispensing gun and nozzle assembly of the invention, showing the same in position just prior to use;

FIG. 2 is an exploded perspective view of the gun and nozzle assembly of FIG. 1, showing the nozzle, the gun unit, the trigger, the liquid and gas valves and other main constituents of the gun;

FIG. 3 is a front elevational view, with the handle shown broken away, and showing certain components of the mixing and dispensing gun of the invention;

FIG. 4 is a front view, partly in elevation and partly in section, showing the liquid component valve forming a part of the gun of the invention;

FIG. 5 is a vertical sectional view of the valve body of the gun, taken along lines 5–5 of FIG. 3 and showing the gas valve of the invention in the open position;

FIG. 6 is a view of a portion of the valve body of FIG. 5 and showing the gas valve in the closed position;

DESCRIPTION OF THE PREFERRED EMBODIMENTS OF THE INVENTION

Figure 7:
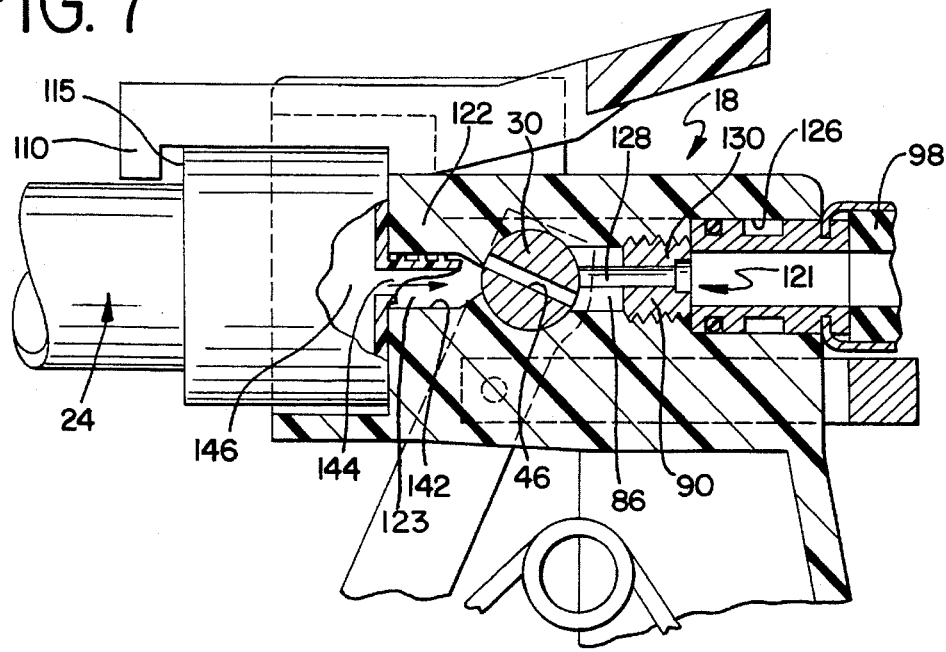
FIG. 7 is a vertical sectional view of the valve body, taken along lines 7–7 of FIG. 3 and showing the closed liquid dispensing valve and other constituents in one operative position.

While the advantages of the present invention may be realized in practice by the use of somewhat different structures, the presently preferred embodiment of the invention is a gun of the type shown in detail in the drawings. Here, the gun assembly is made primarily from plastic materials, with some metal parts, and includes the various structural and functional features to be described in detail. The gun is capable of being produced at very low cost and is able to be mass produced without sacrificing essential quality.

Referring now in particular to FIGS. 1 and 2, a gun and nozzle assembly generally designated 10 is shown to include a number of principal components. These include a gun body generally designated 12, and which includes several major portions including a handle assembly generally designated 14, a nozzle-receiving section generally designated 16, and a valve body generally designated 18. The valve body 18 further includes, at its upper and forward ends, a pair of mounting ears generally designated 20 for mounting a pivotable combination ejector and latch unit generally designated 22. The gun body 12 is preferably formed in a single unit in a molding operation, which may be but need not be supplemented by a small amount of "clean-up" machining.

In FIGS. 1 and 2, it is shown that a nozzle assembly generally designated 24 is positioned by and removable from the nozzle-receiving section generally designated 16 of the gun body 12. The operation of the gun and nozzle assembly 10 is controlled, in a manner to be detailed elsewhere herein, by a trigger assembly generally designated 26 and which pivots so as to move relative to the handle 14. Resistance to movement of the trigger 26 is provided by a trigger return spring 27; a pivotable trigger safety generally designated 28 is shown to be received in part in a slot formed in the front of the handle 14.

In use, the trigger assembly 26 serves to operate both a liquid flow control valve of the spool type generally designated 30 and a reciprocable gas flow control valve generally designated 32 and shown to be positioned within a carrier yoke generally designated 34.

In use, the liquid flow control spool valve 30 extends through a transverse passage 36 defined by a circular sidewall 38 passing through the valve body 18. The valve spool 30 includes left and right hand side ears 40, 42, a reduced diameter contoured cylindrical center section 44, and left and right hand fluid flow passages 46, 48. As used herein, "left" and "right" mean in relation to the hand of a user of the gun. Plural O-rings such as the O-rings 50, for example, are provided for engagement with the sidewalls 38 forming the transverse passage 36. When the spool type valve 30 is positioned within the bore or passage 36, the ears 40, 42 extend out to either side of the valve body 18.

When the spool is rotated about its own center line axis to a predetermined degree, the fluid flow passages 46, 48 permit liquid flow through the spool valve body by registering, to a greater or lesser extent, with associated fluid flow supply passages (not shown in FIG. 2).

The trigger assembly 26 is shown to include a bifurcated upper end portion generally designated 52, and having left and right hand legs 53, 55 having slots 54, 56 formed therein for receiving the valve spool ears 40, 42. With the ears 40, 42 positioned in the slots 54, 56, alignment and locking screws 58, 60 are manipulated so as to extend through and lock into the tapped holes 62, 64 in the valve spool. In this manner, the trigger assembly 26 will pivot about the center line axis of the spool 30 and open or close the valve assembly to liquid flow.

The legs 53, 55 of the trigger 26 also include openings 66, 68 for receiving a pair of pins 70, extending outwardly from the left and right hand side bars 74, 76 of the valve carrier yoke 34. With the pins 70, 72 positioned in the leg openings 66, 68, when the trigger 26 swings through an arc to operate the valve spool 30, the sidebars 74, 76 of the carrier yoke 34 reciprocate, carrying the gas flow valve core 78 positioned by the yoke cross-piece 80 with them.

Referring now to FIG. 5, one end of the gas flow control valve comprises the valve core 78 and the other end comprises a fitting 82 which positions a gas supply hose 84 in gas-tight relation. A description of the valve core 78 and other components of the gas flow control valve 32 appears elsewhere herein.

Referring again to FIG. 2, it is shown that a pair of valve seat inserts 86, 88 are receivable within the valve body 18, where they may be held by threaded locking units 90, 92. Liquid supply hoses 94, 96 include fittings 98, 100 on their end portions for reception in liquid-tight relation to the valve body 18 in a manner described elsewhere herein.

Referring again to FIG. 2, the combination ejector and latch unit 22 is shown to include a backbone 102 with a finger pad 104 at its end. A mounting pin 106 extends transversely of the backbone 102. An ejector element 107 has a forward face 108 adapted to engage an end face portion 109 of the nozzle for ejection purposes, and the forwardmost portion of the backbone 102 of the ejector 22 contains a latching lug 110 for engaging a shoulder on the disposable nozzle 24.

As will appear, the ejector 107 in latch unit 22 undergoes a pivoting action between two positions whose movement is limited by engagement of the finger pad 104 with the valve body 18 on the one hand and engagement of the back- bone 102 with a part of the nozzle 24 in the other position.

Referring again to FIGS. 2 and 8, and in particular to the nozzle unit 24, the nozzle assembly is shown to include a cylindrical main body portion 112, and enlarged diameter rear section 114, with such sections being joined at a radial shoulder 115. The nozzle 24 also includes a nose portion 116 having an outlet passage 118 defined by an interior sidewall 120. Three nipples 122, 124, 126 are provided for respective reception within matching outlet ports in the valve body 18 in a manner to be described later. The nozzle assembly 24 is preferably made from an inexpensive plastic material such that it can be discarded after use.

Figure 9:
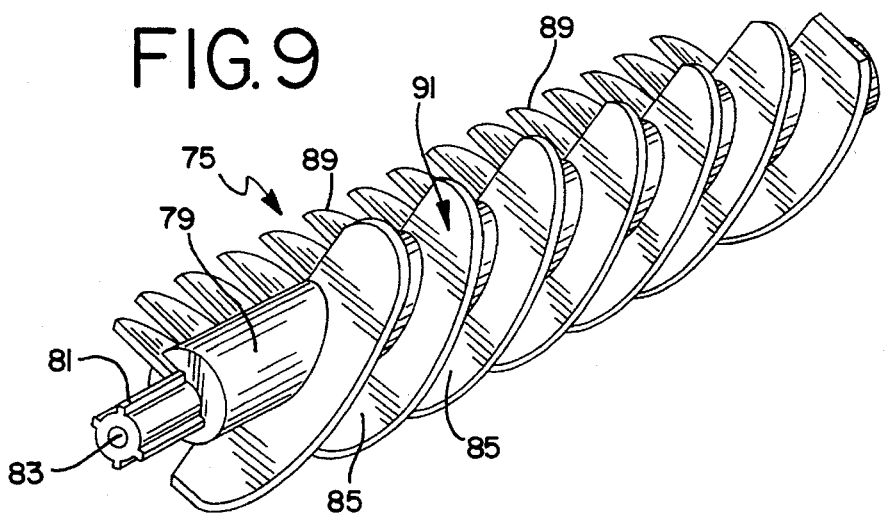

Referring now to FIG. 9, a preferred form of static mixer and gas conduit is shown. Here, a combination static mixer assembly generally designated 75 is shown to include a main backbone 79 forming the OD surface of the conduit, a reduced diameter, splined nose section 81 having a small outlet passage 83 therein. One side of mixer 75 includes plural vanes or blades 85 spaced a given distance apart and occupying one half or 180° of the diameter of the mixer. These elements intersect with plural oppositely directed but more closely spaced vanes or blades 89. As a result, liquid flowing spirally through a wide passage 91 between two more distantly spaced blades 85 will be divided by encountering more closely spaced blades or plates 89. Therefore, as will appear, in passing through the static mixer, streams of liquid material are repeatedly divided into separate streams which are merged or re-united before being divided again to impart a thorough mixing action.

Referring now to FIG. 7, a portion of the interior of the valve body 18 is shown to include a liquid inlet passage generally designated 121 and a liquid outlet passage generally designated 123. The transverse passage 36 formed by the circular sidewall 38 is shown to be occupied by the body of the spool 30. A spool passage 46 is shown to extend through the spool 30. FIG. 7 also shows the hose fitting 98 to be positioned in a counterbore 126, forward of which the jet positioner 90 is shown to be located. The jet 86 itself is shown to be held with its arcuate front face against a cylindrical portion of the body of the spool valve 30 to create a liquid tight seal. The jet 86 includes a center opening 128 and the jet positioner 90 include a center passage 130. FIG. 7 also shows that, on the mating nozzle, the nipple 122 includes ribs 140 (FIG. 8) that engage the walls 142 of the outlet passage 123. An open passage 144 extends through the interior of the nipple 122 and communicates with an interior mixing chamber generally designated 146 forming a part of the nozzle 24.

FIG. 7 shows the arrangement of liquid flow inlet and outlet passages and the liquid flow control spool valve 30 within the valve body 18. The other liquid flow control arrangement is substantially identical, and not being necessary to an understanding of the invention, is not illustrated. As is known to those skilled in the art, however, it is possible to size the individual passages 46, 48 in the spool valve somewhat differently from each other, as may be necessary, if the stoichiometry of the mixture so indicates.

Referring now to FIGS. 5 and 6, the construction and operation of the air valve 32 is shown. Here, the core 78 of the air flow control valve 32 is shown to include a major diameter outer surface 150, a minor diameter outer surface 152, larger and smaller O-ring grooves 154, 156, a center axial blind passage 158 and a transverse passage 160 that intersects the blind passage 158. A valve body air flow passage generally designated 162 shown to be positioned within a lower part of the valve body 18, and this passage is defined by a major diameter or counterbore surface 164, a tapered shoulder 166 and a reduced diameter or forward bore 168. Spaced apart from but near an end wall 170 of the passage 162 is an upwardly extending gas passage 172 that intersects and communicates with the transverse passage 36 in the valve body 18, and, through this passage 36 to a gas outlet passage 174 that extends towards the end face 109 of the nozzle. The passage 174 in use receives the ribs 141 on the center nipple 124 of the nozzle 24. Between the passages 172 and 174, there is an annular space 175, in the form of a sector, lying between the outside diameter center surface 177 of the valve spool 30 and the circular sidewall 38 of the passage 36. This is a space through which gas flows, and is sealed by O-rings and a solid sector 179.

For simplicity in manufacturing, the passage 172 is formed by drilling transversely of the valve body 18 and through both walls of the passage 162. Thereafter, a screw plug 176 is inserted in gas tight relation to the lower portion of the passage 172. This passage could also be formed by molding.

In use, and referring now to both FIGS. 5 and 6, when the trigger is its forward position and the carrier yoke 34 is forward, the valve core 78 is in its forwardmost position. Here, the smaller O-ring 178 engages the surface of the smaller bore 168, creating a gas tight seal forward (or to the left as shown in FIG. 6) of the valve core 78.

The rear or larger diameter O-ring 180 engages the major diameter or counterbore 164 of the passage 162, thus preventing gas leakage to the rear of the valve core 78 or the right as shown in FIG. 6. Thus, the valve is in an off position when the trigger is forward.

As is apparent in FIG. 5, when the valve core 78 is move to the rear, the larger O-ring 180 remains in contact with its associated cylindrical bore 164, preventing gas escape to the rear of the core. However, the smaller O-ring 178, after a suitable degree of movement, will have moved out of contact with the wall 168 forming the smaller diameter passage 162. This opens a passage for gas to flow through the passage 162, up the vertical transfer passage 172 and through the upper gas discharge passage 174 and ultimately, into and out of the interior of the nozzle assembly 24.

Figure 8:
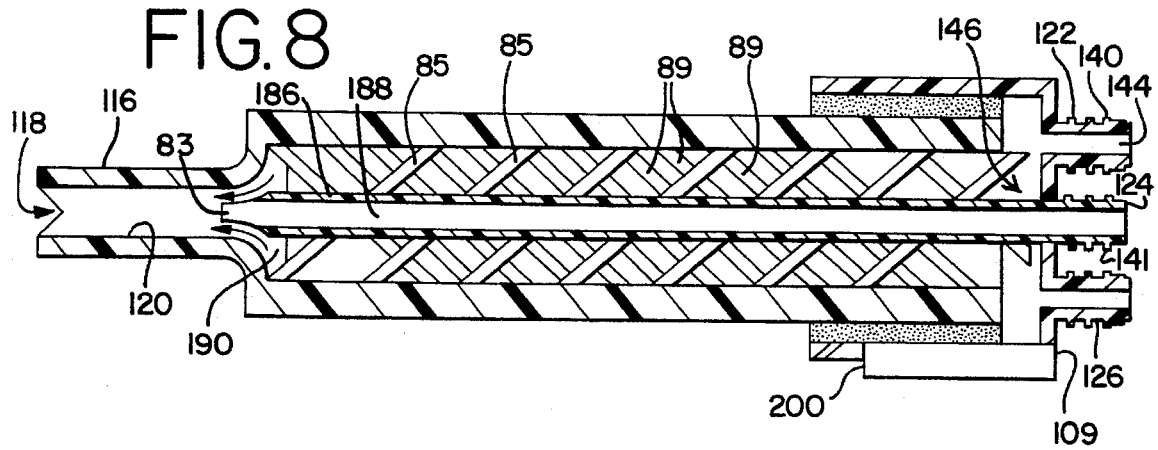
FIG. 8 is a vertical sectional view of the mixing and dispensing nozzle of the invention; and, FIG. 9 is a perspective view of the static mixer and showing the gas passages in the center of the mixer.

Referring now to FIG. 8, the nozzle assembly generally designated 24 is shown to include not only the main body portion 112 including the enlarged diameter rear section 114 and the radial shoulder 115, but to include the plurality of half-circular baffles 85, 89 providing the turbulent-divide-and-recombine action to the liquid contents which enter the short rear mixing chamber generally designated 146 lying between the baffles 85, 89 and the nozzle end wall 109.

As shown, this space 146 is in communication, through nipple passage 144 with one of the liquid outlet passages 123 in the valve body 18. Thus, each of the nipples 122, 124 includes a passage allowing a liquid to enter a portion of the space or mixing chamber 146 wherein the mix is swirled about to increase its residence time and create a mixing action. At this time, the $CO_2$ being formed from an isocyanate-water reaction is just beginning to blow the foam, which undergoes almost all of its expansion after it strikes it target.

As shown in FIG. 8, the center portion of the nozzle 24 includes a larger diameter gas feed passage 188 that necks down to the size of the outlet passage 83. The nose 81 terminates in an annular area 190 where it meets the inner end of the nozzle nose portion 116. The interior sidewall 120 of the nozzle defines a nozzle outlet passage 118 for the gas-propelled, still-reacting foam product.

An important aspect of the nozzle is the spacing of the nose 81 of the conduit 79 in relation to the inside diameter wall 120 of the nozzle nose portion 116. Here, as shown in FIG. 8, the space between the outside wall of the nose 81 and the sidewall 120 portion forms a venturi-like annular zone wherein the gas propellant impinges upon the liquid mixture that is being discharged from the outside of the annulus or space 190.

By placing the nose 81 of the conduit just axially inwardly of this annular area, an excellent propellant action can be obtained, particularly using low viscosity materials and low pressure gas. In the annular area 190, the foaming liquid is traveling generally radially inwardly and just beginning its axial movement out of the nozzle passage 118. Here, the liquids forcing the foam impinge on the gas discharge stream, which picks up the low density liquid and propels it out the nozzle. Thus, the preferred form of the apparatus operates by thoroughly premixing the foam constituents in a baffled chamber, and as they are being warmed by the heat of reaction but before substantially increasing in viscosity from a liquid to a foam of self-sustaining consistency, they are propelled by the gas escaping through the gas feed tube 186. The gas, which is preferably carbon dioxide, is inert with respect to the reaction but easily provides sufficient energy to propel the foam through the air to a target area lying anywhere between several inches to several feet from the end of the nozzle. There, the foam adheres and undergoes almost all its expansion.

As pointed out earlier, the advantage of keeping the liquid ingredients separate until they meet in the mixing chamber 145 is that the gun is essentially non-clogging. According to the invention, while the gas is metered through its own valve system, the gas does not actually meet the liquid components until they have combined and reacted to begin forming a foam which is in the process of curing. This greatly reduces the volume of gas needed for propulsion.

The nozzle is able to be economically manufactured using polyethylene or other suitable materials that are somewhat non-adherent to urethanes and are of low cost.

Referring now to the operation of the unit generally, assuming that it is desired to operate the apparatus, the finger tab portion 104 of the ejector 22 is depressed to actuate the ejector for removing a nozzle which may have remained in the nozzle-receiving area 16 of the gun body 12. Thereupon, a new nozzle 24 is inserted into the nozzle-receiving area 16 with the nipples 122, 124, 126 being aligned in a registered position relative to the various liquid outlet passages such as the passages 123, and the gas outlet passage 174. For this purpose, a key 200 may be provided on the enlarged diameter section 114 of the nozzle 24, with the key being adapted to register with a keyway or slot 202 in the nozzle receiving section 16 of the gun body 12.

Thereupon, the nozzle is pushed axially inwardly or toward the valve body 18 until the ribs 140, 141 on the various nipples engage the respective sidewalls of the various liquid and gas outlet ports or passages. This insures that the nozzle is in liquid- and gas-tight communication with the gun. Such a seating motion of the nozzle also pushes the ejector 106 into a substantially vertical position and registers the latching lug 110 with the shoulder 115 on the nozzle 24, locking it in place against inadvertent discharge.

When it is desired to operate the gun, the operator pushes the free end of the trigger safety 28 upwardly and into the handle slot. Thereupon, the lower portion of the trigger assembly 26 is pulled backwardly, or towards the handle 14. This serves to rotate the spool valve 30 about its own longitudinal axis and register the liquid inlet passages 121 in the gun body with the liquid outlet passages 123 in the valve body, through the liquid flow passages 46 in the spool valve 30. As the trigger is pulled just past the initial registration point between the spool valve and the liquid flow passages, the carrier yoke 34 is pulled backwardly or to the right as shown in the drawings. This "timing" can be adjusted as desired. This moves the yoke center section 80 back, carrying the valve core 78 with it. As the smaller diameter O-ring 156 unseats from the passage sidewall 168, the gas passage is opened and the carbon dioxide or other suitable gas flows through the passages 162, 172, and 174, and from there, through the center passage 210 in the center nozzle nipple 126. Although the gas valve does not possess the degree of proportioning action that the spool valve 30 possess, sufficient propellant is always discharged to propel whatever amount of reaching liquids are being mixed to the target area.

Thus, in the preferred form, substantially all of the gels needed to propel any amount of foam being mixed in the nozzle is discharged when the spool valve is even partially opened. If the spool valve is fully opened, a larger volume of foam is discharged, but in normal operation, there is always adequate propulsion potential from the escaping gas. When the trigger is released and all valves are closed, the gun can be actuated again if the trigger is manipulated within a few seconds to a minute or two after its last operation.

However, if a longer time elapses while the trigger is off, the finger pad 104 on the latch and ejector mechanism 22 is simply depressed and the ejector lug 106 ejects the clogged or filled nozzle from the unit, leaving the liquid discharge passages themselves free of reacting materials. Thereupon, another nozzle may be inserted as described above and the cycle may be repeated any number of times.

According to the invention, the propellant gas may be taken from any convenient source. In some instances, the gas may be generated by a citric acid/water/potassium carbonate or sodium bicarbonate system or otherwise; the gas may also be supplied from a tank of compressed $CO_2$ or other environmentally non-objectionable source.

The source of the resin and isocyanate components respectively is usually a pair of small tanks of conventional construction, such as those described in U.S. Pat. No. 3,784,110. Regarding the regulation of $CO_2$ discharge pressure, this may be done in a number of ways, and while a certain amount of pressure control is desirable, the particular method chosen is not an essential part of the present invention.

The exact finished foam density and chemical character of the foam with which the gun of the invention is suitable for use may vary, as is known to those skilled in the art. As pointed out above, such foams are conventionally polyurethanes but may be modified urethanes, isocyanurates, ureas or like foams. In addition, other reactive products, such as adhesives, caulks or the like may be discharged using the improved gun.

A preferred position of the nose 81 of the static mixer 75 is just at the beginning of the nozzle outlet passage 118, at or near the annular discharge zone 190. However, the nose position can be altered to achieve best results.

The materials from which the gun is preferably made are normally all plastic with the exception of the metal ferrules forming a part of the hose fittings, the trigger return spring, the valve spool and the various fasteners. In one preferred form, the carrier yoke 34 and the valve core 78 may also be made from metal, and in another form, plastic is used. However, the exact choice of materials may vary somewhat depending on the cost and the intended application.

Normally, an important criterion in using such system is that the gun assembly, although it must be highly reliable, must be able to be manufactured at a sufficiently low cost that it is economically justifiable to throw it away after the chemicals contained in one or two sets of packages have been exhausted. The novel arrangement of the valve body, the trigger and the gas and liquid flow valve components render such a goal very attainable.

Inasmuch as most of the foams in question are urethanes, this expression is sometimes used herein and elsewhere in the specification. However, other thermosetting foams may be made and dispensed using this or similar apparatus. Such foams include isocyanurates, ureas, epoxies, silicones, phenolics, or other thermosetting foams known to those skilled in the art. In addition, thermoplastic foams are being developed and might be used in the present system. Hence, the invention is not limited to any particular chemical formulation.

It will thus be seen that the present invention provides an improved low cost dispenser for multi-component products including but not limited to plastic foams, said apparatus having a number of advantages and characteristics, including those brought out in the specification and drawings and others which are inherent in the invention.

A description of one form of the low cost dispenser for multi-component products having been illustrated by way of example, it is anticipated that variations and modifications of the described form of the apparatus will occur to those skilled in the art and it is anticipated that such variations and changes may be made without departing from the spirit of the invention or the scope of the appended claims.

I claim:

1. A gun assembly for mixing and dispensing reactive liquid components and directing a gas for propelling said mixed components to an application site, said gun assembly including, in combination, a valve body, a nozzle positioning portion, and a mixing and dispensing nozzle including nozzle inlets for liquid and gas, said valve body including at least one liquid inlet, at least one liquid outlet, a gas inlet and a gas outlet, said liquid and gas outlets in said valve body and said liquid and gas inlets on said nozzle being respectively constructed and arranged for registry and cooperative axial insertion and removal without nozzle rotation, a liquid valve mechanism positioned within said body between said at least one liquid inlet and said at least one liquid outlet, a gas valve mechanism positioned within said body between said gas inlet and said gas outlet, a trigger having an operative connection to both said liquid valve mechanism and said gas valve mechanism, with said trigger being constructed and arranged so as to permit liquid and gas to flow through said liquid and gas valve mechanisms respectively when both valve mechanisms are fully open, and to open said gas valve mechanism only after said liquid valve mechanism is at least partially open.

2. A gun assembly as defined in claim 1 wherein said at least one liquid inlet comprises a pair of liquid inlets.

3. A gun assembly as defined in claim 2 wherein said nozzle is removably receivable in said nozzle positioning portion of said gun assembly, with said pair of liquid outlets in said valve body being in liquid tight communication with counterpart inlets on said nozzle, and with said gas passage outlet being in substantially gas tight communication with said nozzle inlet for gas.

4. A gun assembly as defined in claim 1 wherein said gun assembly further includes a handle unit integrally formed with said valve body.

5. A gun assembly as defined in claim 1 wherein said nozzle positioning portion comprises a cylindrical recess in said valve body, wherein said nozzle is of cylindrical cross section, and wherein said liquid and gas outlets further include enlarged diameter, nipple-receiving portions in said valve body and wherein said nozzle inlets for liquid and gas includes nozzle inlet passage nipples having sealing surfaces thereon and removably received within said enlarged diameter, nipple-receiving portions.

6. A gun assembly as defined in claim 1 which further includes a combination nozzle latch and ejector element positioned on a portion of said valve body.

7. A gun assembly as defined in claim 1 which further includes a combination nozzle latch and ejector element pivotally mounted to a portion of said valve body, wherein said nozzle includes a pair of cylindrical outer surfaces with a shoulder joining said two surfaces, wherein said latch and ejector element includes a lug portion registerable with said shoulder to latch said nozzle when said nozzle shoulder and said lug portion are registered with each other, said latch and ejector element further including an ejector leg adapted to contact a rear end face of said nozzle for ejecting said nozzle.

8. A gun assembly as defined in claim 1 wherein said liquid valve mechanism includes a spool valve arrangement having liquid passages extending diametrically therethrough, said spool valve being rotatable about its axis to move said passages into and out of registry with said liquid inlet and outlet passages in said valve body.

9. A gun assembly as defined in claim 1 wherein said valve body gas inlet includes an enlarged and a reduced diameter portion, said gas valve mechanism further including a valve core having enlarged and reduced diameter portions sized for snug engagement with said enlarged and reduced diameter inlet portions respectively, passages through said valve core arranged to prevent gas flow when said reduced diameter portions of said core and said inlet respectively are in snug engagement with each other and to permit gas flow when said reduced diameter portions are out of engagement with each other.

10. A gun assembly as defined in claim 9 wherein said valve core is carried by a yoke mechanism including a pair of sidebars having a connection to said trigger, wherein said liquid valve mechanism includes a valve spool secured to a portion of said trigger, said spool valve being movable in response to trigger movement, whereby said yoke mechanism sidebars are actuated by said trigger when said valve spool is rotated by trigger movement.

11. A gun assembly for mixing and dispensing reactive liquid components and a propellant gas, said gun assembly including a valve body including a handle portion, an end face and sidewall sections combining to define a recess for receiving a removable nozzle, said valve body also including a pair of liquid inlets adapted to register with the end portions of hoses for connection to a supply of reactive liquids, liquid outlets terminating in enlarged openings at said end face of said valve body, a gas passageway having an inlet for attachment to the end portion of a gas supply hose and an outlet portion adapted to cooperate with a portion of said nozzle, a liquid flow control valve positioned within said valve body and movable between open, closed and a series of intermediate positions whereby the rate of liquid flow therethrough may be varied by varying the position of said liquid valve, and a gas valve having enlarged and reduced diameter portions and including communicating axial and radial passages therein, said radial passage lying between said enlarged and reduced diameter surfaces, with said gas valve being reciprocable in said gas passageway so as to withdraw said reduced diameter portion of said gas valve from said reduced diameter passage to permit gas flow therethrough, and with said gun assembly further including a trigger operatively connected to both said liquid valve and said gas valve, and with said liquid and gas valves being arranged such that either liquid or gas flow may be initiated at any time relative to each other.

12. In a mixing and dispensing gun of the type having a gun body with at least two liquid inlet passages and two liquid outlet passages, a trigger, at least one trigger-operated valve for controlling liquid flow through said passages, a mixing and dispensing nozzle wherein said two liquids are mixed, said nozzle having two inlet passages and surfaces creating a liquid-tight seal with cooperating portions of said liquid outlet passages in said gun body to prevent leakage between said gun body liquid outlet passages and said nozzle liquid inlet passages, the improvement comprising additionally providing a gas inlet and a gas outlet in said body, and a separate gas valve actuated by said trigger that actuates said valve for controlling liquid flow, said valves being constructed and arranged such that either said gas valve or said liquid valve may open in any sequence in relation to each other, and said nozzle having a gas inlet registrable with said gas outlet in said body, and said nozzle being arranged relative to said body so that cooperating surfaces on said body gas outlet and said nozzle gas inlet are registered with one another in a single position.

13. In a mixing and dispensing gun of the type having a valve body and a pair of liquid inlets, a pair of liquid outlets, and a trigger operated valve for controlling flow of liquid through said inlets and outlets, the improvement comprising additionally providing a gas inlet and a gas outlet, and a gas valve for controlling gas flow through said gas inlet and gas outlet, and a mixing and dispensing nozzle having an enlarged diameter interior mixing space, separate liquid inlets leading to said mixing space, a baffle disposed in said mixing space and a nozzle outlet portion of reduced diameter relative to said mixing space, a gas passage tube extending through said mixing space and terminating in the region of an annular space lying between said reduced diameter nozzle outlet portion and the exterior of said gas passage tube.

* * * * *